(12) United States Patent
Hupfer et al.

(10) Patent No.: US 9,350,560 B2
(45) Date of Patent: May 24, 2016

(54) SELECTIVE INFORMATION SHARING ACROSS TEAM SPACES

(75) Inventors: Susanne Hupfer, Lexington, MA (US); Steven Ross, South Hamilton, MA (US); John Patterson, Carlisle, MA (US); Li-Te Cheng, Malden, MA (US); Eric M. Wilcox, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 1597 days.

(21) Appl. No.: 11/421,232

(22) Filed: May 31, 2006

(65) Prior Publication Data

US 2007/0283278 A1    Dec. 6, 2007

(51) Int. Cl.
*H04L 12/18* (2006.01)
*H04L 29/06* (2006.01)
*G06F 9/54* (2006.01)
*G06Q 10/10* (2012.01)

(52) U.S. Cl.
CPC ............ *H04L 12/1813* (2013.01); *G06F 9/542* (2013.01); *G06Q 10/10* (2013.01); *H04L 65/4015* (2013.01)

(58) Field of Classification Search
CPC ......................... H04L 12/1813; H04L 65/4015
See application file for complete search history.

(56) References Cited

U.S. PATENT DOCUMENTS

| | | | |
|---|---|---|---|
| 6,223,177 B1* | 4/2001 | Tatham et al. ..................... 707/9 |
| 7,072,940 B1* | 7/2006 | Day et al. ....................... 709/204 |
| 7,478,129 B1* | 1/2009 | Chemtob ....................... 709/204 |
| 2002/0138572 A1* | 9/2002 | Delany et al. ................. 709/204 |
| 2004/0103147 A1* | 5/2004 | Flesher et al. ................ 709/204 |
| 2004/0107249 A1* | 6/2004 | Moser et al. .................. 709/204 |
| 2005/0216848 A1* | 9/2005 | Thompson et al. ........... 715/753 |
| 2006/0005163 A1* | 1/2006 | Huesken et al. .............. 717/107 |
| 2006/0026235 A1* | 2/2006 | Schwarz et al. .............. 709/205 |
| 2007/0150551 A1* | 6/2007 | Krishnan et al. ............. 709/218 |

OTHER PUBLICATIONS

Ripley et al., "Workspace Awareness in Application Development", OOPSLA 2004 Eclipse Technology Exchange, pp. 1-5.
Harrison et al., "Re-Place-ing Space: The Roles of Place and Space in Collaborative Systems", CSCW Nov. 16-20, 1996, Cambridge, MA, ACM, New York, 1996, pp. 67-76.

(Continued)

*Primary Examiner* — Aaron Strange
(74) *Attorney, Agent, or Firm* — BainwoodHuang (57) ABSTRACT

A publication-and-subscription mechanism for team rooms, referred to as team room "channels", through which teams are able to selectively share resources from their team rooms with non-members, and that allows selective contributions, modifications, and discussions from non-members. The team room channels operate as bidirectional information pipelines to other team rooms. The team room channels may either be broadcast to all known teams, or be published selectively to one or more designated "target" teams. The receiving team rooms may then subscribe to specific published channels as appropriate. Information items from a team's team room, such as documents, tasks, representations of team members, and/or other resources, may be added to one or more of a team's published channels. Teams can associate specific permissions with each channel, including Read, Contribute, Modify, and/or Discuss. These permissions apply to all items associated with the channel. Teams can subscribe to those channels published to them, to receive synchronous notifications of changes to the channel items.

16 Claims, 7 Drawing Sheets

(56) References Cited

OTHER PUBLICATIONS

Hupfer et al., "Introducing Collaboration into an Application Development Environment", CSCW 04, Nov. 6-10, 2004, Chicago, Illinois, ACM New York 1994, pp. 21-24.

Majchrzak et al., "Deploying Far-Flung Teams: A Guidebook for Managers", Society for Information Management, Chicago, 2003. pp. 1-81.

Olson et al., "Groupware in the Wild: Lessons Learned from a Year of Virtual Collocation", CSCW 96, Cambridge, MA, ACM New York, 1996, pp. 419-427.

Pickering et al., "An Architecture and Business Process Framework for Global Team Collaboration", Intel Technology Journal, 8, Issue 4 (Nov. 2004), pp. 373-382.

Cheng et al., "Jazzing up Eclipse with Collaborative Tools", 2003 OOPSLA Workshop on Eclipse Technology eXchange, Anaheim, Oct. 26-30, 2003. ACM, New York, 2003, pp. 1-5.

Bullock et al, "An access control framework for multi-user colaborative environments", GROUP, Phoenix, Arizona 1999, ACM 1999, pp. 140-149.

Roseman et al., "Team Rooms: Network Places for Collaboration", CSCW 1996, Cambridge MA, ACM 1996, pp. 325-333.

Tate et al, "Simplifying development through activity-based change management", http://www.pliant.org/personal/Tom_Erickson/loops.chi99.paper.html, 11 pages.

Erickson et al., "Socially Translucent Systems: social Proxies, Persistent Conversation, and the Design of Babble", http://www3.software.ibm.com/imbdl/pub/software/rational/web/whitepapers/simplify-dev-abcm.pdf, 14 pages.

\* cited by examiner

SELECTIVE INFORMATION SHARING ACROSS TEAM SPACES

FIELD OF THE INVENTION

The present invention relates generally to computer supported collaborative work, and more specifically to a method and system for selective information sharing across team spaces.

BACKGROUND OF THE INVENTION

Team room software is becoming increasingly popular as a tool for information sharing and collaboration among members of teams. Existing team room systems, such as Lotus QuickPlace, IBM® Workplace Team Collaboration™ team spaces, Groove Workspace, Documentum eRoom, and Microsoft SharePoint Team Services, allow for the creation of virtual project team shared "areas" or "workspaces" that support team communication, coordination, and collaboration. These shared work spaces typically give team members a centralized place where they can store, organize, and retrieve resources and artifacts relating to the team's project, e.g. code files, designs, project documentation, presentations, schedules, and sometimes applications. In addition, team rooms typically support interactive discussion among members, allowing them to chat or otherwise communicate about a project, and solve project issues.

Generally, team rooms are secure areas: Access to their resources and artifacts is restricted to users who have been made members of (i.e. given permission to access) the team room. As project participants join and leave projects, they are added to, or removed from, membership in the project's team room. While keeping team rooms secure is important, this "all-or-nothing" approach to team room membership can be problematic. For example, suppose a team wishes to selectively share some of the team room's contents with an outside person or an external team. In existing systems, non-members can be granted access to the team room, but only by making them members, which exposes all of the team room's contents. The team that created and "owns" the team room content may find this very undesirable, especially since the team room's content, including discussions, may have been created with the understanding that it would be private to the team. Alternative existing solutions involve sending external parties selected content via electronic mail ("email"), or publishing selected content via an RSS ("RDF Site Summary") feed. With either of these techniques, however, the recipients generally cannot see the team room information with the same immediacy as team room members present in the originating team rooms. Moreover, since email and RSS are primarily polling-based technologies, users external to the team room can only see new team room information provided through these techniques when they choose to check their email or read their RSS feeds. In addition, non-members may wish to discuss, or even contribute to, the team room content sent to them. However, existing team rooms provide no technique for outsiders to selectively contribute to or discuss the content they may be forwarded; outsiders must use mechanisms outside the team room, such as email, or must obtain full-fledged team membership, which may be undesirable in some cases.

For the above reasons and others, it would be desirable to have a new system for sharing the contents of a team room with persons that are not members of the team room. The system should allow for selective sharing of the team room contents with non-members, and enable non-members to contribute to and/or discuss the team room contents that is exposed to them, while not requiring exposure of the entire team room contents to non-members.

SUMMARY OF THE INVENTION

To address the above described and other shortcomings of previous solutions, a new method and system are disclosed for selective information sharing across team spaces. The disclosed system provides a publication-and-subscription mechanism for team rooms, referred to herein for purposes of explanation as team room "channels". Through the disclosed team room channels, teams can selectively share resources from their team rooms with non-members, and also allow selective contributions, modifications, and discussions from non-members, without fully opening up all the team room content to non-members.

The disclosed team room channels are a flexible mechanism for multi-way, selective information sharing across multiple team rooms. Team members can create one or more team room channels that operate as bidirectional information pipelines to other team rooms. The created team room channels may either be broadcast to all existing team rooms known to one or more server systems, or be published selectively to one or more designated team rooms associated with one or more server systems.

Team room information items, such as documents, tasks, representations of team members, and/or other resources, can be added to one or more of the team's published channels. When an information item or other resource is added to a channel, the disclosed system may or may not make a copy of it in order to create a conceptual link within the channel to the original item in the originating team room.

In one embodiment, team members are allowed to associate permissions with each outgoing channel, and these permissions define the capabilities of members of target team rooms that subscribe to the channel. The permissions that may be associated with a channel are Read, Contribute, Modify, and/or Discuss. These permissions apply to all items associated with the channel—not to individual items selectively. The "Read" permission allows members of a target team to read all items associated with the channel. The "Contribute" permission allows target team members to add information items of their own to the channel. The "Modify" permission allows target team members to edit and modify existing items associated with the channel, and the "Discuss" permission allows target team members to contribute to discussions about items on the channel. This is only one example of how permissions may be granted in the disclosed system, and alternative embodiments may provide modified versions of this approach to providing permissions, or employ other permission granting mechanisms as may be appropriate.

The disclosed system allows source team room members to add information items to the team room's outgoing channels, modify all information items within the team room's outgoing channels, delete information items from the team room's outgoing channels, and/or discuss any information item in an outgoing channel of the team room, regardless of the permissions associated with the channel.

Further in the disclosed system, target teams can subscribe to channels made available to them, either as result of the channels being broadcast to all team rooms resident on one or more server systems, or as a result of the channels being selectively published to certain team rooms known to and/or located in one more server systems. After a team room subscribes to a channel, its members receive synchronous notifications of changes to the channel, such as new information items being added to the channel, modifications to information items associated with the channel, and/or new entries being made to discussions regarding the information items associated with the channel.

Thus there is disclosed a new system for sharing the contents of a team room with persons that are not members of the team room, that allows for selective sharing of the team room contents with non-members, and that enables such non-members to contribute to and/or discuss the team room contents that is exposed to them, while not requiring exposure of the entire team room contents to the non-members.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
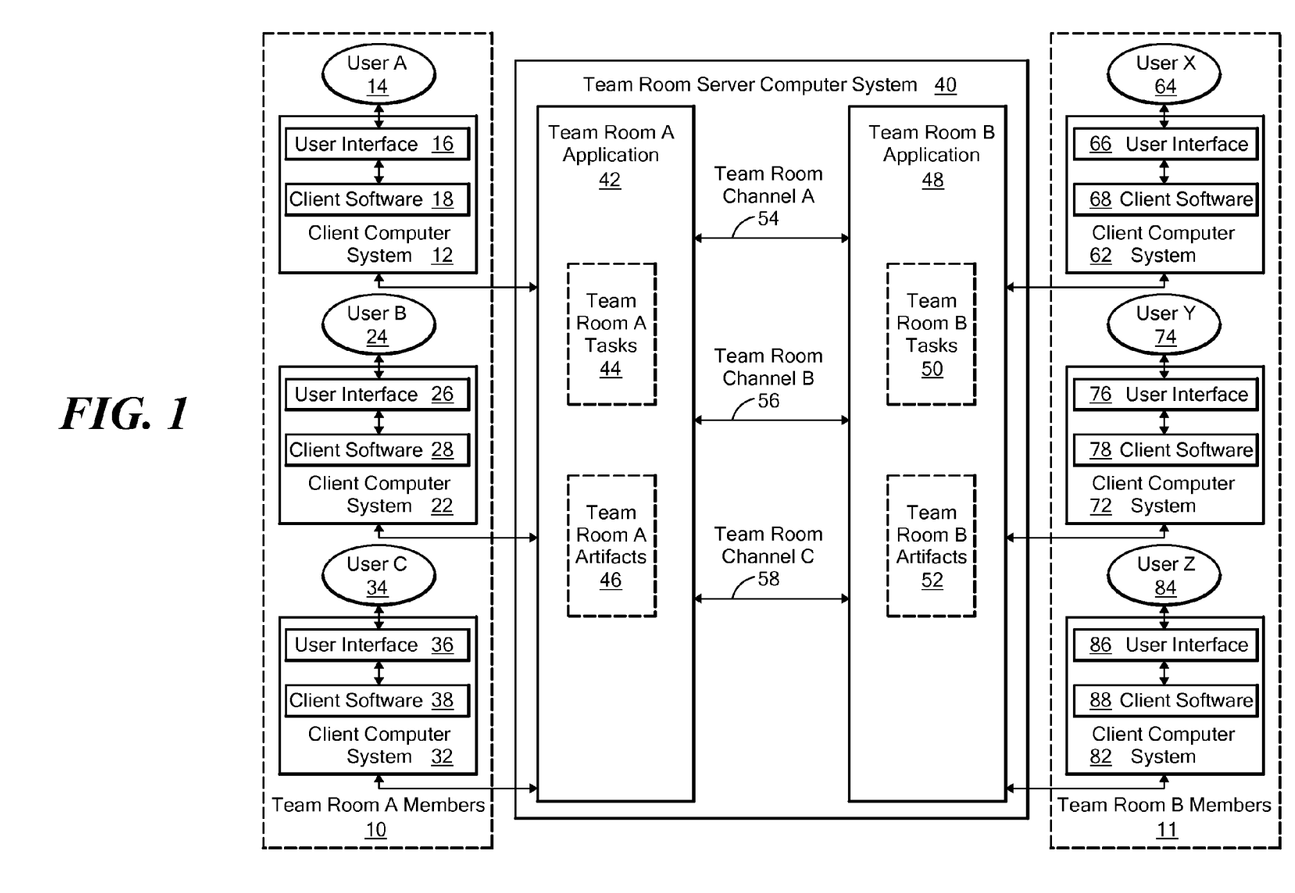
FIG. 1 is a block diagram showing hardware and software components in an execution environment including an illustrative embodiment of the disclosed system.

FIG. 1 is a block diagram showing hardware and software components in an execution environment for an illustrative embodiment of the disclosed system. As shown in FIG. 1, the members 10 of a Team Room A include a User A 14, a User B, 24, and a User C 34. User A 14 is provided a User Interface 16 on Client Computer System 12 by Client Software 18, User B 24 is provided a User Interface 26 on Client Computer System 22 by Client Software 28, and User C 34 is provided a User Interface 36 on Client Computer System 32 by Client Software 38. The members 11 of Team Room B are shown including User X 64, User Y 74 and User Z 84. User X 64 is provided a User Interface 66 on Client Computer System 62 by Client Software 68, User Y 74 is provided a User Interface 76 on Client Computer System 72 by Client Software 78, and User Z 84 is provided User Interface 86 on Client Computer System 82 by Client Software 88.

The client computer systems 12, 22, 32, 62, 72 and 82 of FIG. 1 are communicably connected to a Team Room Server Computer System 40, for example by way of a communication network such as the Internet, a Local Area Network (LAN), or other specific type of communication network. The client software 18, 28 and 38 for members 10 of Team Room A communicates with the Team Room A Application program 42 to provide the respective user interfaces 16, 26 and 36. Similarly, the client software 68, 78 and 88 for members 11 of Team Room B communicates with the Team Room B Application program 48 to provide the respective user interfaces 66, 76 and 86. Client software 18, 28, 38, 68, 78 and 88 may, for example, use a client-server approach to operating with the server software 42 and 48. Alternatively, the client software 18, 28, 38, 68, 78 and 88 may include Web browser program functionality operable to request and receive Web page content, including HTML (Hypertext Markup Language) code or the like, from their respective Team Room applications, and to render such Web page content in their respective user interfaces.

The client computer systems 12, 22, 32, 62, 72 and 82, and Team Room Server Computer System 40, may each include at least one processor, program storage, such as memory, for storing program code executable on the processor, and one or more input/output devices and/or interfaces, such as data communication and/or peripheral devices and/or interfaces. The client computer systems 12, 22, 32, 62, 72 and 82, and the Team Room Server Computer System 40 may each further include appropriate operating system software. The client computer systems 12, 22, 32, 62, 72 and 82 may further include portions of an integrated development environment (IDE), such as the Eclipse IDE as provided by the Eclipse Foundation.

While for purposes of clear illustration and concise explanation FIG. 1 shows only three client computer systems for members of Team Room A, three client computer systems for members of Team Room B, and one Team Room Server Computer System 40, the disclosed system is not so limited, and those skilled in the art will recognize that there may be multiple other client and/or server computer systems in an operational environment of an embodiment of the disclosed system. A given user may be a member of any number of team rooms (>=0) at a given time, but can only be "present" within one team room at a given time. Any specific number of users may be members of a given team room at a given time. Moreover, while only two team rooms are shown in FIG. 1, the disclosed system is applicable to configurations or deployments having any specific number of team rooms.

Team Room A Application 42 and Team Room B Application 48 provide team rooms that are virtual, shared "areas" or "workspaces" that support communication, coordination, and collaboration between their respective team members. Specifically, Team Room A Application 42 creates a virtual workspace that is shared by members 10 of Team Room A, and Team Room B Application creates a virtual workspace that is shared by the members 11 of Team Room B. Team Room A Application 42 enables the members 10 of Team Room A to store, organize, and retrieve Team Room A Artifacts 46, which may be related to a team project for which the members 10 of Team Room A are responsible. Team Room A Application 42 controls the Artifacts 46 such that accesses to and/or operations on the Artifacts 46 can by default only be performed by the members 10 of Team Room A. Team A Artifacts 46 are examples of resources of Team Room A, and may include any specific type of information, for example, code files, designs, project documentation, presentations, schedules, and/or application programs. Team Room A Application 42 further provides interactive discussion among members 10, for example through an instant messaging and/or any other specific type of communication application.

Similarly, Team Room B Application creates a virtual workspace that is shared by members 11 of Team Room B, and Team Room B Application 48 creates a virtual workspace that is shared by the members 11 of Team Room B. Team Room B Application 48 enables the members 11 of Team Room B to store, organize, and retrieve Team Room B Artifacts 52, which may be related to a team project for which the members 11 of Team Room B are responsible. Team Room B Application 48 controls the Artifacts 52 such that accesses to and/or operations on the Artifacts 52 can by default only be performed by the members 11 of Team Room B. Team Room B Artifacts 52 are examples of the resources of Team Room B, and may include any specific type of information, for example, code files, designs, project documentation, presentations, schedules, and/or application programs. Team Room B Application 48 further provides interactive discussion among members 11, for example through an instant messaging and/or any other specific type of communication application.

In the disclosed system, a number of team room channels, shown for purposes of illustration by Team Room Channel A 54, Team Room Channel B 56, and Team Room Channel C 58, enable members 10 of Team Room A to selectively share Artifacts 46, Tasks 44, and/or other resources from Team Room A with members 11 of Team Room B. Other team room channels may be created to enable members 11 of Team Room B to selectively share Artifacts 52, Tasks 50, and/or other resources from Team Room B with members 10 of Team Room A. As further described below, the Team Room Channels 54, 56 and 58 provide bi-directional information sharing across multiple team rooms.

Team Room A Tasks 44 are tasks that the Team Room A Members 10 have planned, are engaged in, and/or have completed, and are maintained by the Team Room A Application 42 for the purpose of enhancing cross-team awareness and coordination. Each of the tasks stored in the Tasks 44 indicates or contains task-related information such as: which of the Team Room Team Members 10 are assigned to the task, the status of the task (e.g. completed, planned, or underway), a priority associated with the task (e.g. high priority or low priority), a description of the task, and which of the Team Room A Artifacts 46 are associated with the task. Team Room A Tasks 44 are also examples the resources of Team Room A.

Team Room B Tasks 50 are tasks that the Team Room B Members 11 have planned, are engaged in, and/or have completed, and are maintained by the Team Room B Application 48 for the purpose of enhancing cross-team awareness and coordination. Each of the tasks stored in the Tasks 50 indicates or contains task-related information such as: which of the Team Room Team Members 11 are assigned to the task, the status of the task (e.g. completed, planned, or underway), a priority associated with the task (e.g. high priority or low priority), a description of the task, and which of the Team Room B Artifacts 52 are associated with the task. Team Room B Tasks 50 are also examples of the resources of Team Room B.

While FIG. 1 shows Team Room A Tasks 44 and Team Room A Artifacts 46 as examples of resources of Team Room A, and Team Room B Tasks 50 and Team Room B Artifacts 52 as examples of resources of Team Room B, the disclosed system is not so limited. Accordingly, the disclosed system may be embodied using any specific type of team room resource in addition or in the alternative.

Figure 2:
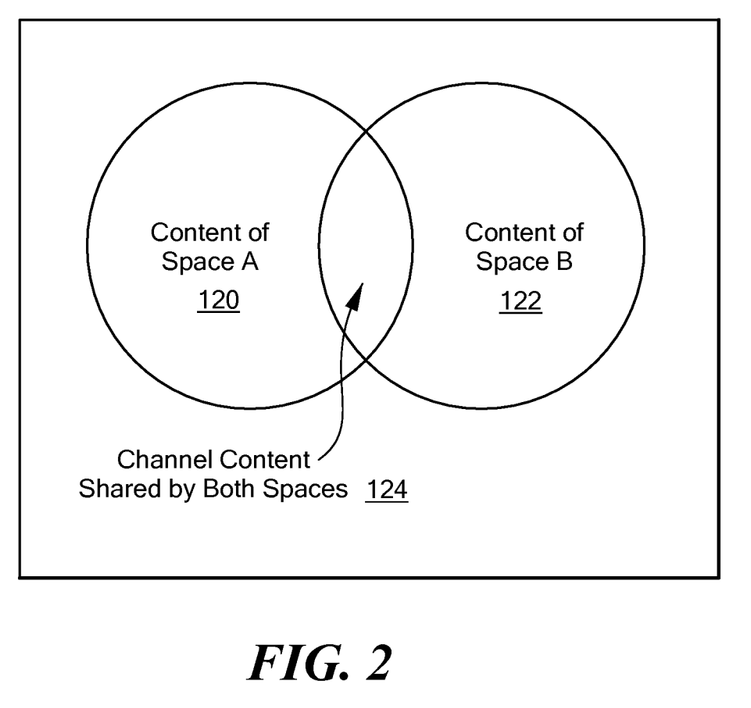
FIG. 2 is a block diagram illustrating the sharing of content between team spaces using the disclosed system.

FIG. 2 is a block diagram illustrating the sharing of content between team spaces using the disclosed system. As shown in FIG. 2, the Content of Space A 120, which may consist of any specific type of information item, is partially shared with a Content of Space B 122, by way of Channel Content Shared by Both Spaces 124. As in FIG. 2, team rooms may sometimes be referred to herein for purposes of explanation as "spaces".

Figure 3:
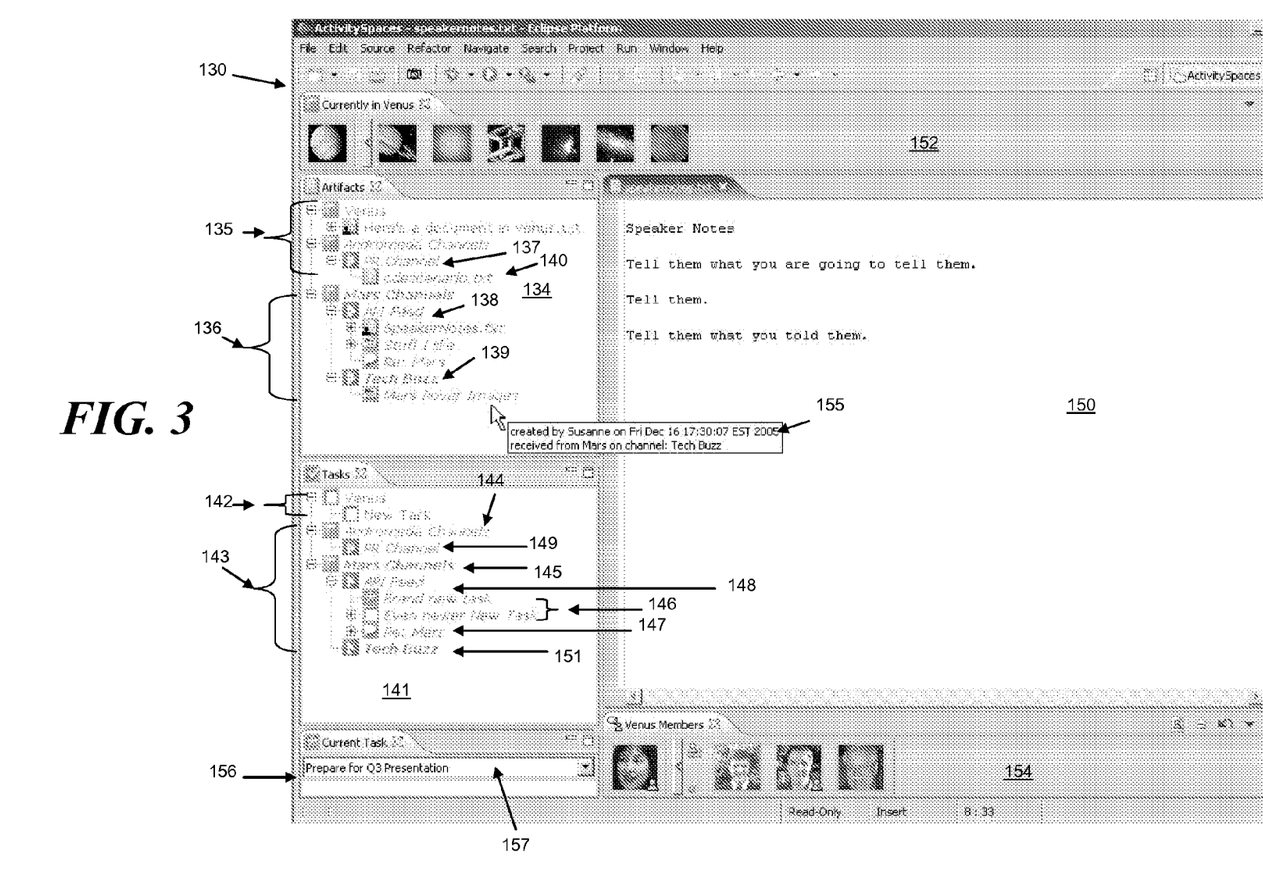
FIG. 3 is a screen shot illustrating a team room application user interface generated by an embodiment of the disclosed system to simultaneously provide a view of team room artifacts, channels, tasks, and related on-line discussions.

FIG. 3 is a screen shot illustrating a team room application user interface 130 generated by an embodiment of the disclosed system to simultaneously provide a view of team room artifacts, channels, tasks, and related on-line discussions. The user interface 130 displays a team room for a user that is a member of that team room, for example the team room that is the "Venus" space. The "Artifacts View" display region 134 shows a hierarchy 135 of representations of artifacts (e.g. documents and related on-line discussions) belonging to the current Venus space. Below the artifacts 135 appears a list 136 of representations of channels to which the Venus space has subscribed. In the example of FIG. 3, the Venus space has subscribed to the "PR Channel" 137 that the Andromeda space is publishing, and the "API Feed" 138 and "Tech Buzz" 139 channels that the Mars space is publishing. Underneath each of the listed channels 137, 138 and 139, a hierarchy is displayed of artifacts and associated on-line discussions, such as instant messaging or other types of communication sessions, that have been published to the channel. For example, the "PR Channel" 137 currently has just one artifact, cdescenario.txt 140. Any artifacts that the Andromeda team adds to the PR Channel will show up below the "PR Channel" representation 137 for all members of the Venus space. Further in the example of FIG. 3, items appearing on a channel are shown in italics within the user interface, in order to indicate to the user that the information is shared with others outside the current space. Any other type of appropriate visual indication may be used alternatively for this purpose, and such a visual convention may be used to distinguish representations of both incoming and outgoing channel items from representations of other items that are not associated with a channel. In addition, if the Andromeda team publishes a new document to the PR Channel, or modifies an existing document already on the PR Channel, or if a new comment is added to a discussion related to the PR Channel, any of those events are made immediately visible to the Venus team through the user interface 130, by displaying a representation of the new document, or by changing the visual representation of the modified document or discussion, for example by making the text bold, or changing its color, or in some other visually significant way.

Also shown in the user interface 130 of FIG. 3 is a "Tasks View" display region 141. Analogous to the "Artifacts View" display region 134, the "Tasks View" display region 141 includes a hierarchy 142 of tasks (and related on-line discussions) that represent a "to do list" for the Venus space. The tasks in the hierarchy 142 may each, for example, include schedule information as well indications of team member responsibilities with regard to certain actions. Below the hierarchy 142 of Venus's own tasks, a list 143 of channels appears, indicating information about the channels to which the Venus space has subscribed, grouped by originating space. Accordingly, the Andromeda Channels 144 includes "PR Channel" 149, and the Mars Channels 145 includes "API Feed" 148 and "Tech Buzz" 151. Any tasks that Andromeda or Mars publish to those channels will show up for the Venus team to see. As shown in FIG. 3, the "API Feed" channel 148 is shown including representations of two tasks 146 and an on-line discussion 147 that are associated with that channel.

A hover over information display or "tooltip" 155 shows an example of information that can be displayed when the user hovers the cursor over a display element in the "Artifacts View" display region 134, such as creation date, author, channel received on, source team room, and date and time of receipt on the channel from the source team room.

The user interface 130 further includes a display region 150 that provides an "editor area" for the user, in which resources from the current team room itself, or from an incoming channel, may be displayed in their current form, and/or modified. A team room selection display region 152 displaying representations of a number of team rooms to which the user can navigate, for example by clicking on the representation of the desired team room. A team room member display region 154 displays representations of team room members of the current team room, and enables the user to initiate a communication session, such as an instant messaging session, with a given team room member by clicking on the displayed representation of that team member.

A "Current Task" display region 156 is also included in the user interface 130 to provide the user with the ability to switch among his or her assigned tasks, making the related artifacts, subtasks, and discussions for that task easily available. The current task of the user may be communicated to other team members in order to provide current task awareness across the team regarding which task each team member is currently working on. In the example of FIG. 3, for purposes of illustration, the current task is selected using the pull down menu 157, but other specific selection mechanisms may be used in the alternative.

Figure 4:
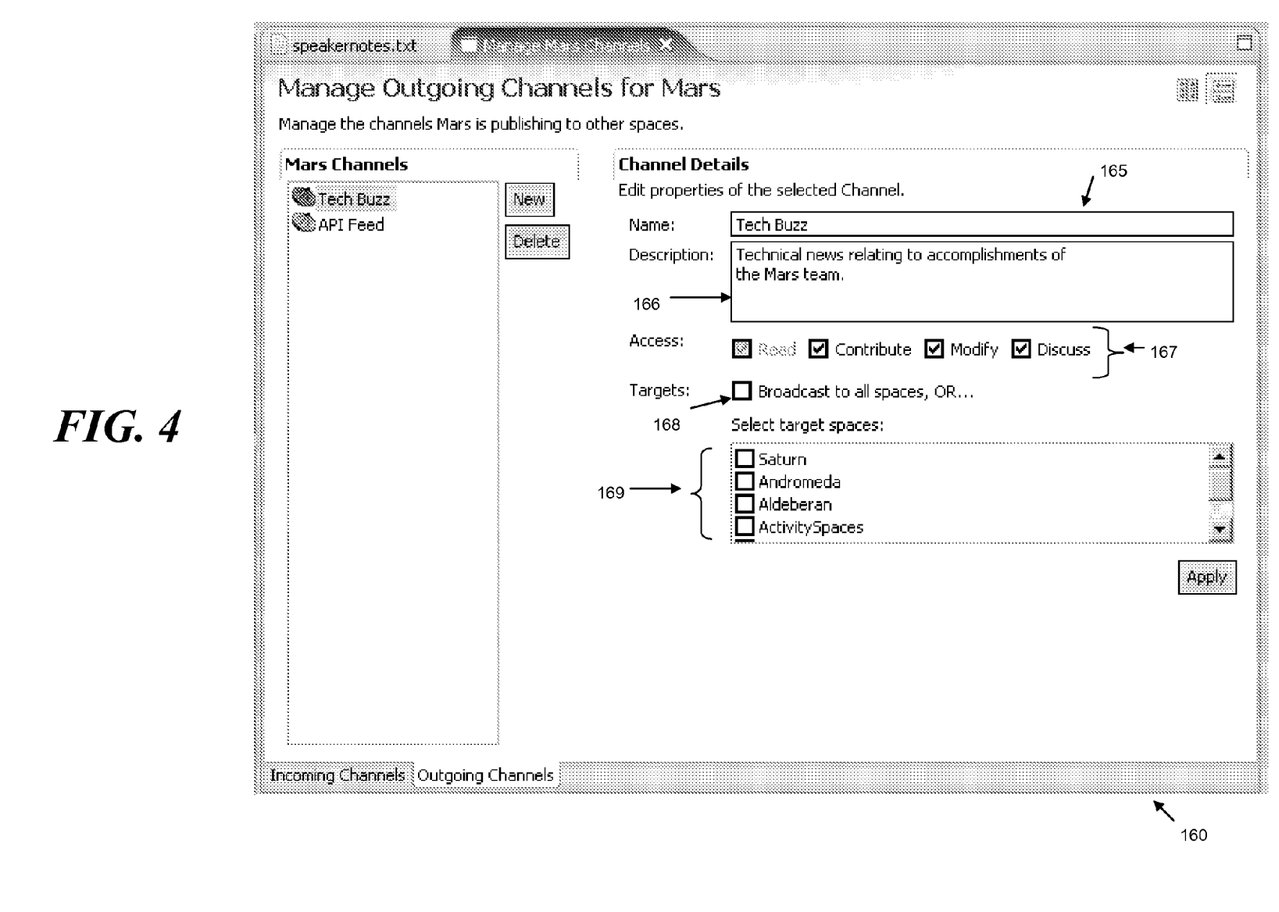
FIG. 4 is a screen shot illustrating a team room application user interface generated by an embodiment of the disclosed system to enable a team room member to create, modify, and/or delete outgoing channels.

FIG. 4 is a screen shot illustrating a team room application user interface 160 generated by an embodiment of the disclosed system to enable a team room member to create, modify, and/or delete outgoing channels. The user interface 160 of FIG. 4 illustrates an interface through which a member of a space, e.g. the Mars space, goes about creating, modifying, and/or deleting outgoing channels in an embodiment of the disclosed system. For each outgoing channel, the team member supplies a name in the field 165, a description in the field 166, and access permissions using the check boxes 167. The access permissions that may be specified are Read, Contribute, Modify, and Discuss.

The user interface 160 further enables the user to indicate whether the existence of the channel is to be broadcast to all spaces known to one or more server systems, for example by checking the check box 168, or is to be communicated only to a select number of spaces, for example by checking next to the desired spaces in the list of spaces 169.

If the check box 168 is checked, then all spaces known by or hosted by the server system are considered target spaces. Otherwise, only the spaces checked within the list 169 are considered target spaces. Target spaces are the only spaces that will be provided the option of subscribing to the channel. In an alternative embodiment, a visual indication of which target team rooms have subscribed to which outgoing channels may also be provided in the user interface 160.

Figure 5:
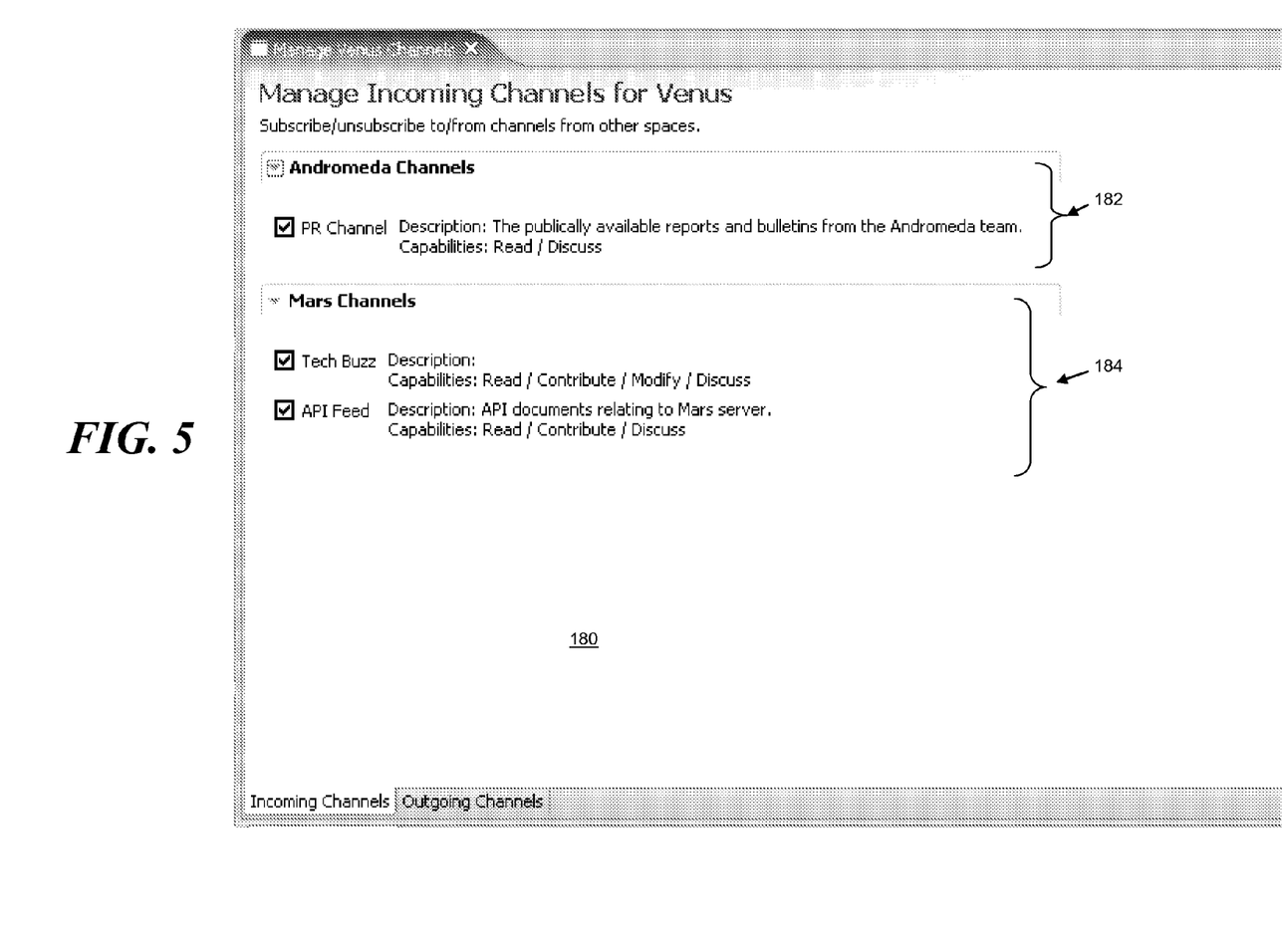
FIG. 5 is a screen shot illustrating a team room application user interface generated by an embodiment of the disclosed system to enable a team room member to subscribe a team room to incoming channels that other team rooms have supplied to it.

The user interface 180 of FIG. 5 is an illustrative example of a user interface through which a member of a space, e.g. Venus, goes about subscribing to incoming channels that other spaces have made available to it. In the example of FIG. 5, the incoming channels 182 that have been made available by the Andromeda space are shown including the "PR Channel", while the incoming channels 184 that have been made available by the Mars space include the "Tech Buzz" and "API Feed" channels. Each channel displayed in the user interface 180 lists the name of the channel, a description of the channel, and the permissions ("Capabilities:") associated with the channel. In order to subscribe the team space to a an available channel, the user checks the corresponding check box for that channel. To unsubscribe the team space from the channel, the user unchecks the corresponding check box for the channel. In the example of FIG. 5, the Venus space has subscribed to each of the "PR Channel", "Tech Buzz", and "API Feed" channels. In one embodiment, channels are subscribed to on a team-wide basis, such that all team members receive all channels that their team is subscribed to. In the example of FIG. 5, all members of the Venus team will see the "PR Channel", "Tech Buzz", and "API Feed" channels that Venus has subscribed to. In an alternative embodiment, individual team members may be given more control over which of the team's subscribed channels they would like to see in their user interface.

Figure 6:
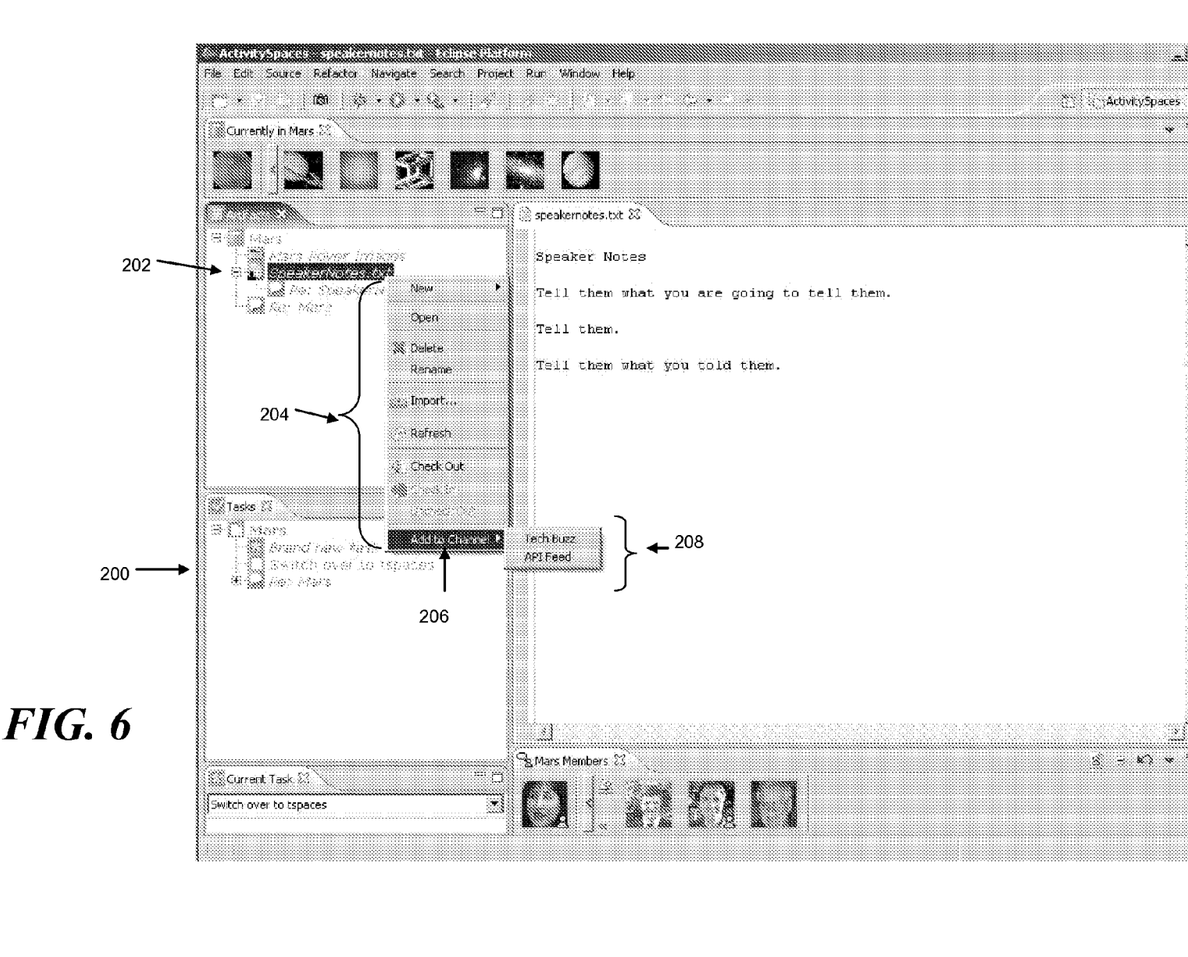
FIG. 6 is a screen shot illustrating a team room application user interface generated by an embodiment of the disclosed system to enable a member of a team room to associate an information item with one of the team room's outgoing channels.

FIG. 6 is a screen shot illustrating a team room application user interface 200 generated by an embodiment of the disclosed system to enable a member of a team room to publish an artifact to one of the team room's outgoing channels. As shown in FIG. 6, the user interface 200 includes a representation 202 of an information item "speakernotes.txt", which the user has right-clicked on to generate the options menu 204. Among the options made available through the menu 204 is an "Add to Channel" option 206, over which the cursor has been dragged to generate indications 206 of the channels "Tech Buzz" and "API Feed". If the user clicks on the indication "Tech Buzz", then the information item "speakernotes.txt" will be added to the channel "Tech Buzz". Similarly, if the user clicks on the indication "API Feed", then the information item "speakernotes.txt" will be added to the channel "API Feed".

While FIG. 6 shows how one possible embodiment of the disclosed system operates to enable a user to add an information item to a channel, any other specific user interface mechanism or technique may be used in alternative embodiments. Moreover, while FIG. 6 illustrates publishing an artifact to a channel, other kinds of resources (e.g. tasks or representations of people) may be published through the disclosed channels, for example using the illustrative technique for adding an information item to a channel of FIG. 6, or using some other appropriate technique for a given embodiment.

Figure 7:
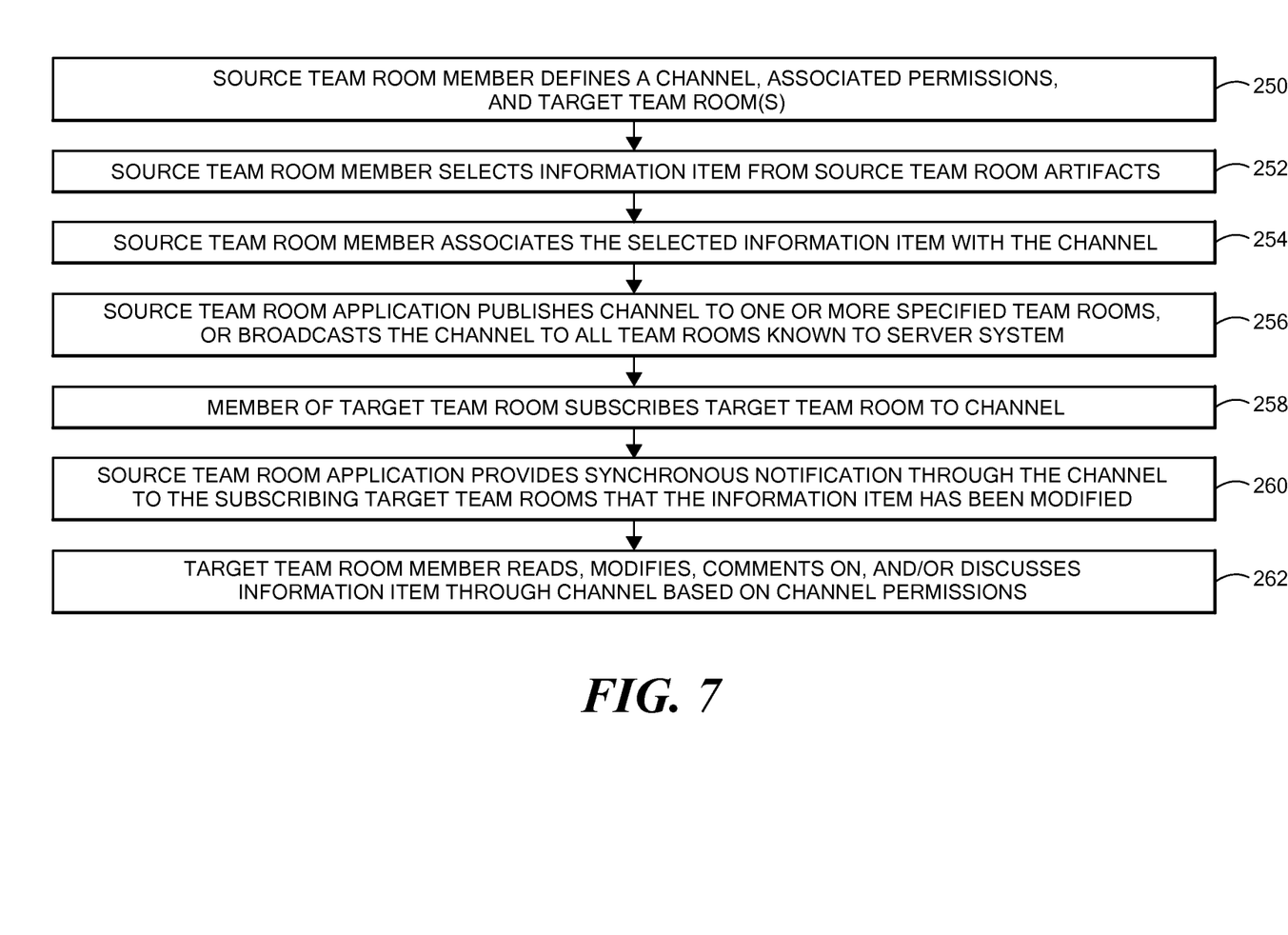
FIG. 7 is a flow chart illustrating steps performed in an embodiment of the disclosed system.

FIG. 7 is a flow chart illustrating steps performed in an embodiment of the disclosed system. At step 250, a member of a source team defines a channel, for example by entering a channel name. The source team member also indicates the permissions to be associated with the channel, for example by selecting one or more of the permissions Read, Contribute, Modify, and/or Discuss. The "Read" permission allows members of a target team room to read all items associated with the incoming channel. The "Contribute" permission allows target team room members to add information items of their own to an incoming channel. In one embodiment, such added information items are stored in or under the control of the source team room. The "Modify" permission allows target team room members to edit and modify existing items associated with the channel, and the "Discuss" permission allows target team members to contribute to on-line discussions related to information items associated with the channel. As noted above, in alternative embodiments, other specific types of permissions may provided for association with the disclosed channels.

Further at step 250, the source team room member indicates the target team rooms for the channel. The target team rooms are the team rooms to which the channel will be made available. Only target team rooms for a channel are permitted to subscribe to the channel. In one embodiment, step 250 is performed through the user interface 170 of FIG. 4.

At step 252, a source team room member selects one or more information items from the source team room artifacts. The selection of the information item from the source team room resources may, for example, be performed through the user interface 200 shown in FIG. 6, in which the information item "speakernotes.txt" has been selected. At step 254, the information item selected at step 252 is associated with a channel. For example, the information item selected at step 252 may be associated with a channel in step 254 by way of the right click menu 206 shown in FIG. 6. After step 254, the information item selected at step 252, such as a file, document, on-line discussion, task, or other unit of content, may be accessed by members of target team rooms for the channel, if their respective team rooms subscribe to the channel, under the restrictions defined by the permissions associated with the channel. When an information item is added to a channel, the disclosed system may or may not make a copy of it for use in the target team rooms, in order to create a conceptual link within the channel to be used by members of the target team rooms to access the original item within the originating team room.

At step 256 (which may occur either before or after steps 252 and 254) the source team room application publishes the channel defined at step 250 to all members of the target team rooms for the channel. In one embodiment, the target team rooms for a channel may consist of all the team rooms known to a server system, or of only those team rooms expressly indicated to be target team rooms by a member of the source team room. A channel may be published to its target team rooms at step 256 by a message or other indication being sent by the source team room application to the members of those target team rooms indicating the existence of the channel, and allowing them to subscribe to the channel through their team room user interface.

At step 258, one or more members of the target team rooms to which the channel was published at step 256 subscribe their respective team rooms to the channel. When a team room member subscribes to a channel, he or she does it on behalf of the entire team room, and the result is that all members of that team room are subscribed to the channel. After a team room is subscribed to a channel, all members of that team room can access the information items associated with the channel consistent with the permissions associated with the channel by a member of the source team room. The subscription performed at step 258 may, for example, be performed through the user interface 180 of FIG. 5.

At step 260, the source team room application provides synchronous notification to the members of the subscribing target team rooms that an information item associated with the channel has been modified. Alternatively, the notification at step 260 may be made in the event that a new information item has been associated with the channel. The notification provided at step 260 is immediately displayed in the user interface of the receiving team room members. For example, if one of the information items displayed in association with a channel through the user interface 130 of FIG. 3 is modified, the display representation of that information item may be immediately changed to indicate the modification to the item. Such visual change may consist of bolding the text name of the information item, changing the text color of the name of the information item, changing the icon adjacent to the information item, or some other visual change. Only members of those team rooms that have subscribed to a channel are provided with visual indications of new or modified information items associated with the channel.

At step 262, a target team room member accesses an information item associated with a channel, under the constraints defined by the permissions associated with the channel. For example, in the event that the "speakernotes.txt" information item contained in the "API Feed" channel 138 of the user interface 130 of FIG. 3 has the "Modify" permission associated with it, then user would be allowed to select "speakernotes.txt", for example by double clicking on it, then modify the contents of "speakernotes.txt", for example in the editor area display region 150. Similarly, if the "API Feed" channel 138 has the "Contribute" permission associated with it, the user would be allowed to add one or more comments or other resources to the channel, potentially also through the display region 150 of FIG. 3. If the "API Feed" channel 138 has the "Discuss" permission associated with it, the user would be permitted to join one or more on-line discussions related to the "speakernotes.txt" information item, such as real-time conferences based on instant messaging, chat sessions, or other types of communication applications or systems, and potentially also provided in a display region within the user interface 130 of FIG. 3.

Embodiments of the disclosed system may be implemented in a variety of specific ways. One implementation uses the Eclipse development platform, including the Eclipse workbench, using Eclipse tree views for the Artifacts and Tasks views, and the Eclipse Forms API as the basis for the Channel Management user interfaces. For configurations in which all team rooms reside on a single server system, implementing the disclosed team room channels may, for example, include providing the proper access rights to appropriate channel information in each team room on the server. Alternatively, if team rooms reside on different servers, appropriate channel information must be communicated across servers.

The disclosed system provides a number of advantages over previous solutions. First, the disclosed team room channels provide selective access to the contents of a team room. This is an improvement over previous systems, which have associated access with team room boundaries, such that only members who belonged to a team room had permission to perform team room actions, and discuss documents, while non-members had no permission to see the content or perform team room actions. The disclosed team room channels provide a way for targeted outside teams to see, and possibly alter, selected team room content.

Also, unlike using email or polling-based RSS feeds to make team room content available to outsiders, the disclosed team room channels allow outsiders to see new or modified channel-based items as immediately as they would see new or modified items that belong to their own team room. Email and RSS are generally "pull" mechanisms; a user must explicitly "check email" or "read an RSS feed." In contrast, the disclosed team room channels support notifications (i.e. "push" functionality); a user will see changes immediately in the user interface as they occur.

Moreover, while supplemental techniques such as email or RSS may require a user to leave the team room application for another application (i.e. email client or RSS reader), with the disclosed channels, a user need not leave the channels-equipped application—or even their current team room—to see incoming content from other teams. A user of a subscribing team room space sees items appearing on a subscribed-to channel very similarly to how one would see items native to one's own space.

Furthermore, unlike email or conventional RSS feeds, which are unidirectional and can only communicate content from a team room to outsiders, the disclosed team room channels are bidirectional: They provide a way not only for outsiders to see selected team room content, but also to perform actions directly on that content (e.g. modify and/or discuss it).

The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative graphical user interface constructs, one skilled in the art will recognize that they may be embodied using a variety of other alternative graphical user interfaces.

We claim:

1. A method, embodied in at least one computer system, for selective sharing of information across team spaces, comprising:
    enabling a member of a source team room to define a synchronous channel for said source team room;
    enabling said member of said source team room to select at least one selected information item from resources contained in said source team room, wherein said at least one selected information item is a subset of all resources contained in said source team room;
    enabling said member of said source team room to associate said selected information item with said synchronous channel;
    enabling said member of said source team room to publish said synchronous channel to at least one target team room;
    enabling a member of said target team room to subscribe said target team room to said synchronous channel;
    automatically providing a synchronous notification through said synchronous channel to said target team room responsive to said selected information item being modified;
    enabling said member of said target team room to modify said selected information item through said synchronous channel;
    adding, to said synchronous channel by said member of said source team room, subsequent to said member of said source team room publishing said synchronous channel to said target team room, a document that is contained in said source team room;
    permitting said member of said target team room to modify said document in response to detecting i) that said synchronous channel was published from said source team room to said target team room and ii) that said document was added to said synchronous channel subsequent to said synchronous channel being published to said target team room, and iii) a modify permission associated with said synchronous channel; and
    wherein said member of said target team room is not a member of said source team room.

2. The method of claim 1, further comprising automatically providing a synchronous notification through said synchronous channel to said target team room responsive to another information item being associated with said synchronous channel.

3. The method of claim 1, wherein said enabling said member of said source team room to publish said synchronous channel to said at least one target team room further comprises broadcasting availability of said synchronous channel to all other known team rooms.

4. The method of claim 1, further comprising:
    enabling said member of said source team to select said at least one target team room; and
        wherein said enabling said member of said source team room to publish said synchronous channel to said at least one target team room comprises publishing said synchronous channel to only said at least one target team room selected by said member of said source team.

5. The method of claim 1, wherein said enabling said member of said source team room to associate said selected information item with said synchronous channel comprises creating a link to an original copy of said selected information item contained in the source team room.

6. The method of claim 1, further comprising:
    enabling a member of said source team room to select at least one synchronous channel permission from the set of permissions consisting of a read permission, a contribute permission, a modify permission, and a discuss permission;
    enabling said member of said source team room to associate said synchronous channel permission with said synchronous channel;
    wherein said read permission allows all members of said target team room to read all information items associated with said synchronous channel;
    wherein said contribute permission allows all members of said target team room to associate new information items with said synchronous channel;
    wherein said modify permission allows all members of said target team room to modify all information items associated with the synchronous channel;

wherein said discuss permission allows all members of said target team room to contribute to online discussions regarding information items associated with the synchronous channel; and wherein said selected permission is applied to all information items associated with said synchronous channel.

7. The method of claim 1, further comprising:

enabling said member of said source team room to select at least one communication session between members of said source team room;

enabling said member of said source team room to associate said selected communication session with said synchronous channel; and permitting said member of said target team room to join said communication session in response to i) said member of said source team room associating said communication session with said synchronous channel, and ii) a discuss permission associated with said synchronous channel.

8. The method of claim 7, wherein said communication session comprises an instant messaging session between members of said source team room; and wherein a contents of said instant messaging session is related to said document.

9. The method of claim 7, wherein said communication session comprises an online discussion between members of said source team room; and wherein a contents of said instant messaging session is related to said document.

10. A system including at least one processor and a computer readable memory, said computer readable memory having program code stored thereon for, when executed by said at least one processor, selectively sharing information across team spaces, said program code comprising:

program code for enabling a member of a source team room to define a synchronous channel for said source team room;

program code for enabling said member of said source team room to select at least one selected information item from resources contained in said source team room, wherein said at least one selected information item is a subset of all resources contained in said source team room;

program code for enabling said member of said source team room to associate said selected information item with said synchronous channel;

program code for enabling said member of said source team room to publish said synchronous channel to at least one target team room;

program code for enabling a member of said target team room to subscribe said target team room to said synchronous channel;

program code for automatically providing a synchronous notification through said synchronous channel to said target team room responsive to said selected information item being modified; and program code for enabling said member of said target team room to modify said selected information item through said synchronous channel;

program code for adding, to said synchronous channel, responsive to said member of said source team room, subsequent to said member of said source team room publishing said synchronous channel to said target team room, a document that is contained in said source team room;

program code for permitting said member of said target team room to modify said document in response to detecting i) that said synchronous channel was published from said source team room to said target team room and ii) that said document was added to said synchronous channel subsequent to said synchronous channel being published to said target team room, and iii) a modify permission associated with said synchronous channel; and wherein said member of said target team room is not a member of said source team room.

11. The system of claim 10, wherein said program code further comprises program code for automatically providing a synchronous notification through said synchronous channel to said target team room responsive to another information item being associated with said synchronous channel.

12. The system of claim 10, wherein said program code for enabling said member of said source team room to publish said synchronous channel to said at least one target team room further comprises program code for broadcasting availability of said synchronous channel to all other known team rooms.

13. The system of claim 10, wherein said program code further comprises: program code for enabling said member of said source team to select said at least one target team room; and wherein said program code for enabling said member of said source team room to publish said synchronous channel to said at least one target team room comprises program code for publishing said synchronous channel to only said at least one target team room selected by said member of said source team.

14. The system of claim 10, wherein said program code for enabling said member of said source team room to associate said selected information item with said synchronous channel comprises program code for creating a link to an original copy of said selected information item contained in the source team room.

15. The system of claim 10, wherein said program code further comprises:

program code for enabling a member of said source team room to select at least one synchronous channel permission from the set of permissions consisting of a read permission, a contribute permission, a modify permission, and a discuss permission;

program code enabling said member of said source team room to associate said synchronous channel permission with said synchronous channel;

wherein said read permission allows all members of said target team room to read all information items associated with said synchronous channel;

wherein said contribute permission allows all members of said target team room to associate new information items with said synchronous channel;

wherein said modify permission allows all members of said target team room to modify all information items associated with the synchronous channel;

wherein said discuss permission allows all members of said target team room to contribute to online discussions regarding information items associated with the synchronous channel; and wherein said selected permission is applied to all information items associated with said synchronous channel.

16. A computer program product including a non-transitory computer readable storage medium, said non-transitory computer readable storage medium having program code stored thereon for selectively sharing information across team spaces, said program code comprising:

program code for enabling a member of a source team room to define a synchronous channel for said source team room;

program code for enabling said member of said source team room to select at least one selected information item from resources contained in said source team room, wherein said at least one selected information item is a subset of all resources contained in said source team room;

program code for enabling said member of said source team room to associate said selected information item with said synchronous channel;

program code for enabling said member of said source team room to publish said synchronous channel to at least one target team room;

program code for enabling a member of said target team room to subscribe said target team room to said synchronous channel;

program code for automatically providing a synchronous notification through said synchronous channel to said target team room responsive to said selected information item being modified;

program code for enabling said member of said target team room to modify said selected information item through said synchronous channel;

program code for adding, to said synchronous channel, responsive to said member of said source team room, subsequent to said member of said source team room publishing said synchronous channel to said target team room, a document that is contained in said source team room;

program code for permitting said member of said target team room to modify said document in response to detecting i) that said synchronous channel was published from said source team room to said target team room and ii) that said document was added to said synchronous channel subsequent to said synchronous channel being published to said target team room, and iii) a modify permission associated with said synchronous channel; and wherein said member of said target team room is not a member of said source team room.

* * * * *